Nov. 10, 1953 W. W. OSBORNE 2,658,702
EMERGENCY EXIT MEANS FOR AIRCRAFT
Filed May 1, 1950 2 Sheets-Sheet 1

Wilbur W. Osborne
*INVENTOR.*

BY
HIS PATENT ATTORNEY.

Nov. 10, 1953 — W. W. OSBORNE — 2,658,702
EMERGENCY EXIT MEANS FOR AIRCRAFT
Filed May 1, 1950 — 2 Sheets-Sheet 2

Wilbur W. Osborne
*INVENTOR.*

BY James M. Clark

HIS PATENT ATTORNEY.

Patented Nov. 10, 1953

2,658,702

UNITED STATES PATENT OFFICE 2,658,702

EMERGENCY EXIT MEANS FOR AIRCRAFT

Wilbur W. Osborne, Glen Rock, N. J., assignor to Curtiss-Wright Corporation, a corporation of Delaware Application May 1, 1950, Serial No. 159,209

10 Claims. (Cl. 244—137)

The present invention relates generally to aircraft and like vehicles and more particularly to quickly extensible means for providing an emergency exit from the cabins and other parts of aircraft and other vehicles.

In aircraft, and particularly large aircraft provided with tricycle type landing gears, the fuselage floor is frequently disposed at an appreciable distance above the ground while the airplane is at rest. It is customary in disembarking and loading passengers from transport aircraft at regularly scheduled stops and fully equipped airports to provide a suitable landing stage of a portable type which is stored upon the ground and moved up to the cabin door to permit the loading and unloading of passengers. Aircraft are occasionally required to make landings, in some cases of an emergency nature, at airports or at portions of a runway where such landing stages are not readily available, and in such cases it is desirable that suitable emergency means be provided to permit egress of the passengers from the cabin with a minimum of delay. A number of emergency means have been proposed and utilized for such contingencies and have not proven especially satisfactory for various reasons. The present invention is accordingly directed to an improvement in such emergency exit means.

The present invention consists essentially of a telescoping escape column or pole assembly which is supported at the extremity of a swingable crane arm or bracket, both of which are normally stowed in a retractable position within the exit door of the aircraft cabin. The crane bracket and telescoping pole member are preferably provided with suitable winding drum or reel means by which the pole member can quickly be lowered or extended to its operative contacting position with the ground, and by means of which it may be retracted for stowage within the cabin door. The present invention is also directed to an improved mounting mechanism for the telescoping pole member at the ends of the swingable crane whereby the pole elements are positively extended by gravitational pull in a manner which insures a substantially vertical escape means regardless of the attitude at which the aircraft or the cabin door may be resting upon the ground. It further is of a type which does not require the first person to leave the aircraft such as by jumping and requires no assistance from a person on the ground as in certain prior devices. It further contemplates the provision of suitable positive-acting link means which will lock the door in a predetermined open position and further link means which will lock the crane brackets in a predetermined position in respect to the opened door. The present invention also encompasses the provision of adjustable friction means to retard the extension of the pole elements as they fall into position due to gravitational pull and also includes a retractable handle by means of which the drum may be rotated for retraction of the pole elements into their stowed position within the door.

It is, accordingly, a principal object of the present invention to provide a positive and quick-acting emergency exit means for alighting from the cabins or other portions of aircraft while at rest upon the ground. It is a further object of this invention to provide an improved telescopic pole assembly which is quickly and positively extended to a position adjacent the cabin door opening and by means of which passengers or other personnel may make a rapid and expeditious exit from the cabin of the aircraft in an emergency. Another object of this invention resides in an improved crane type suspension for an emergency exit means which is normally stowed within the confines of an aircraft cabin door and which can be quickly swung into and automatically locked at its operative position. A further object resides in the provision of an improved suspension arrangement for a telescoping escape pole assembly which insures its extension along a substantially vertical axis irrespective of the attitude at which the aircraft or its supporting door may be disposed while the aircraft is upon the ground. A still further object of the present invention resides in an improved cable drum or reel means for the extension of the pole assembly at a predetermined lowering rate controlled by adjustable friction means and which also permits the pole to be compacted and retracted into a stowable position within the door.

Other objects and advantages of the present invention will occur to those skilled in the art after reading the following description when taken in conjunction with the accompanying drawings, forming a part hereof, in which:

Fig. 1 is a side elevational view of an airplane to which a form of the improved emergency exit means has been applied to the door thereof;

Fig. 2 is a detailed cross-sectional view of the exit means in its extended position and with the door partially opened;

Fig. 3 is an elevational view of the same in its retracted position as stowed within the aircraft door;

Figure 4:
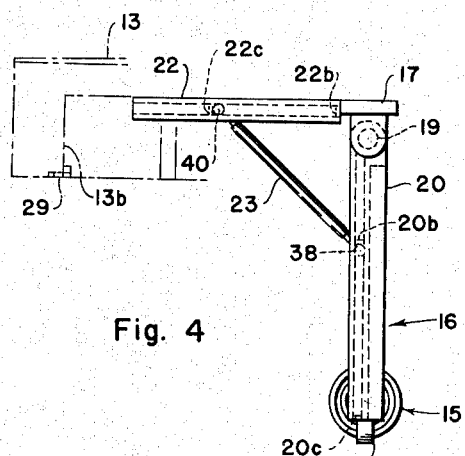
Fig. 4 is a plan view of the exit means and its supporting bracket in its operative position.
Figure 5:
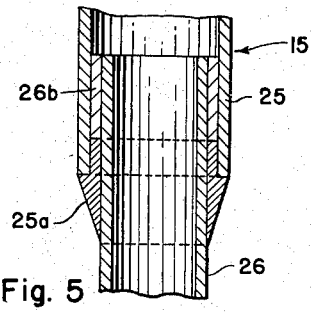
Fig. 5 is an enlarged detail cross-section of one of the telescoping joints of the exit means.

Referring now to Fig. 1, the numeral 10 represents an airplane provided with a tricycle type landing gear consisting of the main wheel units 11 and the nose wheel unit 11a. The airplane is provided with a cabin portion 12 provided with an outwardly swinging door 13 for the door opening 14 and the door 13 is provided with the presently improved escape means including a telescoping escape pole 15 supported from the swinging bracket or crane assembly 16. The arrangement is preferably such that with the door 13 in an opened position as shown in Fig. 1, the extended pole assembly 15 is disposed in front of the door opening 14 in a position convenient for passengers to step from the cabin 12, grasp the pole 15 with both arms and legs and slide, without delay, down the pole to the ground.

Referring now to Figs. 2 and 3, it will be noted that the door 13 is hingedly mounted upon the fuselage in the airplane by means of the hinges 13a and is provided with a recess 13b within which the pole and supporting bracket assemblies 15 and 16 are adapted to be stowed when not in use. The door 13 is also preferably provided with a handle 13c, which may be centrally located, for unlatching and latching the door.

Figure 8:
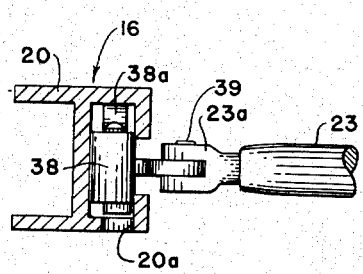
Fig. 8 is a detail cross-section of the sliding connection at one terminal of the bracket positioning link.
Figure 9:
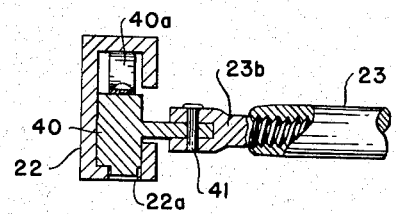
Fig. 9 is a similar cross-sectional view of the terminal at the opposite end of the same link.

The swinging bracket or crane assembly 16 is pivotally supported by the fittings 17 and 18 mounted adjacent the hinged jamb of the door and within which is pivotally mounted the framework of the bracket assembly comprising the vertical member 19, the upper horizontal rail member 20 and the diagonal brace or bracket member 21. The horizontal guide rail member 20 is preferably of I-beam cross-section and is adapted to be folded back about the vertical axis of the pivot members 17 and 18 against a fixed guide member 22, which is preferably of hollow generally C-shape rectangular cross-section substantially symmetrical with the adjacent half of the member 20. The guide members 20 and 22 are provided with guide slots within which the terminals of the diagonal tie or strut 23 are adapted to slide into predetermined positions at which they may be locked into the apertures 20a and 22a, respectively, as shown in Figs. 8 and 9.

The pole assembly 15, as may be seen in Fig. 2, is suspended from a pivotally mounted yoke member 24 such that it is universally mounted upon the end of the crane member 20, and when extended may have its axis in a substantially vertical line. The yoke suspension fitting 24 is pivotally mounted adjacent the upper terminal of the upper and outer tubular element 25 within which the next lower and smaller diameter tubular element 26 is adapted to slidingly telescope, being limited in its extended position by the terminal fittings 25a at the lower end of the element 25 and the terminal fitting 26b at the upper terminal of the tubular element 26. Similarly, the smaller diameter tubular element 27 is adapted to telescopically slide within the larger and higher tubular element 26 being limited in its relative axial movement with respect thereto by its upper treminal fitting 27b and the lower terminal fitting 26a of the element 26. In a similar manner, the still smaller diameter and lowermost tubular element 28 is adapted to axially slide within the tubular element 27, being limited in its relative axial movement with respect thereto by its upper terminal fitting 28b and the lower terminal fitting 27a on the element 27. The tubular element 28 has fixedly attached to its lower terminal a flanged stop element 28a against which each of the lower terminal fittings 25a, 26a and 27a are adapted to abut to limit the telescopic or compacting movements of the several tubular sections, as more particularly shown in the stowed position in Fig. 3. In this figure, which shows the tubular escape assembly 15 in its retracted and stowed position, it is retained within the recess 13b within the door by means of the pivotally attached latching or locking lever 29 which prevents inadvertent swinging of the assembly from its recess within the door. The floor of the recess 13b slopes inwardly of the cabin and downwardly as indicated at 13f in Fig. 3.

Figure 7:
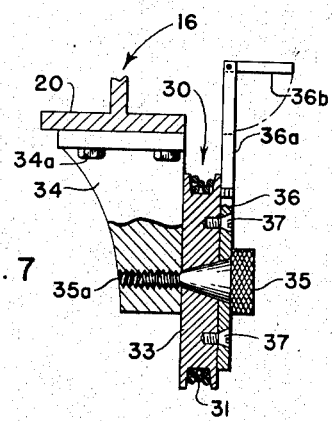
Fig. 7 is a cross-sectional view of the cable drum shown in Fig. 6.
Figure 6:
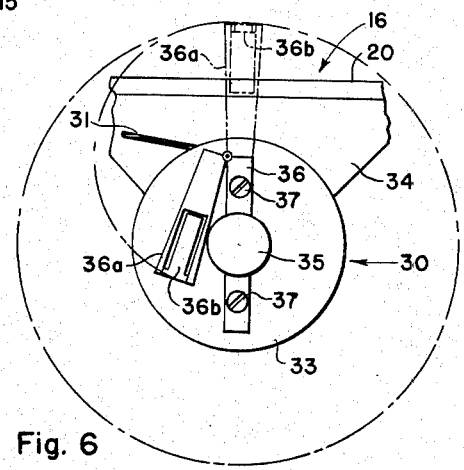
Fig. 6 is an elevational view of the cable winding and release drum.

As shown in Fig. 3, and in greater detail in Figs. 6 and 7, the extension and retraction of the telescoping pole assembly 15 is accomplished by the cable drum or reel assembly 30 to which is attached the flexible cable 31, which in turn extends downwardly vertically through the openings in the nested tubular sections to the lower terminal fitting 28a to which it is attached by the cable terminal 31a. The cable is guided at its upper outer portion adjacent the yoke member 24 at the cable sheave 32, and the drum 33 of the drum assembly 30 is pivotally mounted upon the bracket 34 suspended from the horizontal beam element 20, to which it is attached by the screws 34a. The pivotal mounting of the drum 33 is accomplished by the conic pivot bolt 35 having a knurled head for manual adjustment and a threaded shank at 35a engaging the bracket element 34. Through the outer face of the drum 33 there is attached a folding handle 36 by means of the screws 37, the handle having a fixed portion attached to the drum 33, a laterally foldable arm portion 36a to the outer end of which is attached a radially foldable hand grip portion 36b which is foldable into a recess in the arm portion 36a. This permits the handle to be folded in the counterclockwise direction into a flush position adjacent the thumb screw pivot 35 as shown in Fig. 6, such that in the retracted position of the pole assembly 15, the assembly can be lowered merely by unlatching the lever 29 and the assembly pulled or lifted forward out of its recess in the door by inserting the hand in the recess 13e (Fig. 3) and the frictional gripping effect of the thumb screw pivot 35 is released sufficiently to permit the lower telescoping portions to slide out of the recess along its sloping floor 13f and thence extend to the ground. As the drum is caused to rotate in the counterclockwise direction as the cable 31 is payed out, the retracted handle 36 is in a flush condition in which there is less possibility of its striking and injuring the hand of the operator. On the other hand, when it is desired to crank up the drum to lift the telescoping sections for retraction within the door, the handle assembly 36 is unfolded and rotation of the handle and drum assembly 30, by gripping the handgrip 36b, in the clockwise direction accomplishes compacting of the tubular pole sections of the assembly 15 for retraction within the door. In construction lines in Fig. 6, the extended or unfolded position of the handle 36 is indicated, as well as the arcuate paths through which the unfolded handle is extended and rotated from its full line retracted position, as well as the circular path of the outer end of the handle as it is rotated in the clockwise direction about the axis of the pivot 35 for retraction of the pole assembly 15.

In order that the pole supporting assembly 16 be extended to its proper position and be positively retained in that position, the intermediate diagonal strut or brace 23 is provided with terminal fittings 38 and 40 which are adapted to be guided within the elements 20 and 22, respectively. The diagonal brace 23 for the support member 20 is provided with terminal clevises 23a and 23b, to the first of which the terminal fitting 38 is attached by the pin 39. The support beam member 20, as shown in Fig. 4, is provided with a detent aperture 20a for engagement by the fitting 38 adjacent the inner stop 20b, and an outer limit stop is provided at 20c. Within the rail 22, fixed to the door 13, the fitting 40 attached to the brace 23 and its terminal clevis 23b by the pin 41, is adapted to engage the detent opening 22a adjacent the outer stop 22c, as also shown in Fig. 4, and which rail 22 is also provided with an inner limit stop 22b. Attached to the fitting 38 is a leaf type spring 38a for continually urging the fitting 38 downwardly into its engaging condition with the detent opening 20a and a similar spring 40a is attached to the upper portion of the guided fitting 40 for urging the same into engagement with the hole 22a in the guide rail 22. Accordingly, to fold the rail 20 into the door 13 against the fixed rail 22, the terminal fitting 38 within the rail 20 is lifted slightly against the opposition of the spring 38a into the position shown in Fig. 8, in which its detent portion is removed from the opening 20a and the fitting then is caused to slide outwardly within the guide portion of the rail 20 toward the stop 20c as the rail 20 is rotated in the counterclockwise direction about the vertical pivot axis of its hinge strut 19. Once the fitting 38 starts to slide along the guide portion beyond the hole 20a, the opposite end of the brace 23 may be lifted from its position, as shown in Fig. 9, against the opposition of the spring 40a, and this terminal of the brace moves toward the hinge end or stop 22b of the rail 22 until the brace 23 becomes nested within the guide portions of the rails 20 and 22, and the rails are caused to lie adjacent each other.

As shown in Fig. 3, the door 13 is preferably provided with a centrally disposed handle 13c by means of which it may be moved to its open and closed positions, and rotated for latching the door in the closed position. The door 13 is also provided with a link 42 which is pivotally connected to the door by the fitting 13d and the link 42 is preferably slidably attached to the fuselage structure in such manner as to limit the position to which the door 13 may be swung outwardly, and also to retain the door at that position.

The improved exit means described above may preferably be operated as follows: Let us assume that with the door 13 closed and latched and the emergency exit means 15 and 16 in its stowed position within the door, it is desired to extend the pole assembly 15 into its operative position for emergency exit or egress from the fuselage cabin 12. The door may initially be unlatched by rotation of the handle 13c and the door pushed outwardly into a partially opened position, while the pole retaining latch 29 is released and dropped into its unlocking position. With the door held in a partially opened position, the operator may pass his hand into the recess 13e and pull the pole assembly toward him out of its recess 13b in the door such that the weight of the several sections cause them to slidingly extend until the lower stop fitting 28a reaches and rests upon the ground. In pulling the pole assembly 15 toward the operator in the partially opened position of the door, the pole now passes closely in front of the door opening 14 and adjacent the sill of the door opening.

In order to insure that the several sections unfold or extend, it may be necessary to release the frictional pressure by backing off the thumbscrew 35 on the winding drum. Alternatively, in the event the several telescoping sections may bind and the lower elements fails to extend fully to the ground, the first person to slide down the pole assembly may cause the lower section to become fully extended when his body or his feet make contact with the lower fitting 28a and all or a portion of his weight is applied to this fitting and to the lower section 28. Before the pole is used, however, it is desirable that, after it has reached the ground, the door is first pushed outwardly into its position of predetermined opening. This can be accomplished by pushing upon the brace 23 such that its terminal fitting 40 is caused to move along the guide rail 22 away from the hinge axis 19 toward the rail stop 22c at which the fitting 40 is caused, by the spring 40a, to engage the detent opening 22a and to anchor the outer end of the brace 23. Such a force applied to the brace 23 will cause the door to move outwardly due to the reaction of the other terminal of the brace against the support beam member 20 and the pole assembly 15 which may have its lower end in contact with the ground and may additionally be disposed against the side of the airplane, both of which conditions tend to oppose movement of the brace toward the airplane and cause it to push the door 13 outwardly.

With the brace terminal 40 latched into the detent opening 22a, further outward movement of the door causes the terminal fitting 38 at the opposite end of the brace 23 to move along its guide rail within the support member 20 toward the hinge axis 19 and toward the rail stop 20b at which the terminal fitting 38 engages the detent opening 20a. When the fitting 38 engages the stop 20b and latches into the opening 20a, continued outward movement of the door causes the brace 23 to pull the pole and supporting assembly 16 outwardly with the door inasmuch as the frame formed by the members 20, 22 and 23 is now rigid and moves as a unit. This pulling of the support member 20 by the outwardly moving door also causes the pole assembly 15 to be moved outwardly away from the sill of the door opening in the fuselage to a predetermined position away from the fuselage at which the movement of the door is arrested and retained by the link 42 between the fuselage structure and the door structure at the pivot 13b. This position of the pole assembly 15 will be sufficient for a person to reach the pole from the door opening conveniently without extending his arms or body too far from the door sill and, after grasping the pole with his arms and legs, to slide comfortably down the pole with adequate clearance for his body as he moves downwardly past the door sill to safety upon the ground.

When it is desired that the pole assembly be retracted and be stored within the door, the reverse of the foregoing operation is followed. Assuming that the operator is within the aircraft cabin and he desires to store the exit means within the door and to close the door, he will first unfold the handle on the winding drum assembly 30 and wind up the drum such that all of the sections of the pole assembly are telescoped into their compacted position. The door may then be partially closed and the terminal fitting 38 lifted against the spring 38a and the end of the brace moved along the guide rail 20 such that closing movement of the door may be continued. When the door has been closed through a further angle, the terminal fitting 40 may be lifted from its detent opening and the brace 23 guided toward its terminal stop 22b in the rail 22. Continued closing movement of the door may then be accomplished and as the door is latched into its closed position, the beam 20 becomes positioned closely alongside the beam 22 and the pole assembly 15 is positioned in the recess 13b in the door, into which it may be latched by the lever 29.

It will be apparent that the preferred form described and shown is for illustrative purposes only and not by way of limitation, but may be modified extensively to suit varying conditions. The length and number of tubes required will depend largely upon the available space for stowage in the door as well as the distance from the attaching point to the ground and the tube assembly may be attached to hatches and other forms of closures than the door illustrated.

Other forms and modifications of the present invention, which will occur to those skilled in the art after reading the foregoing description, are intended to come within the scope and spirit of this invention as more particularly set forth in the appended claims.

I claim:

1. In aircraft, a fuselage having an opening in a vertical wall portion thereof, a door hingedly mounted adjacent a vertical edge of said opening, an escape pole assembly suspended from said door, support means carried by said door for said escape pole assembly arranged to move said assembly from a retracted position within said door to an extended position away from said door and across said fuselage opening for emergency exit therefrom, and strut means connecting said door to said support means for retaining said escape pole assembly in a predetermined operative position.

2. In aircraft, a fuselage having an opening in a vertical wall portion thereof, a closure movably supported at an edge of said opening for movement about a vertical axis, telescoping escape means supported from said closure, swingable support means carried by said closure for supporting said escape means from said closure and manually operated hoisting and lowering means for telescopically retracting and extending said escape means for egress from said fuselage opening.

3. In aircraft, a fuselage having an opening, a closure movably supported at an edge of said opening, telescoping escape means suspended gravitationally from said closure, swingable support means for supporting said escape means from said closure, manually operated hoisting and lowering means mounted upon said closure for telescopically retracting and extending said escape means for egress from said fuselage opening, and strut means interconnecting said closure with said fuselage for retaining said closure in a predetermined operative opened position.

4. In aircraft, a fuselage having an opening in a vertical wall thereof, a vertical closure movably supported at an edge of said opening, telescoping escape means suspended from said closure, swingable support means for supporting said escape means from said closure, manually operated hoisting and lowering means pivotally mounted upon said closure for telescopically retracting and extending said escape means for egress from said fuselage opening, strut means interconnecting said closure with said fuselage for retaining said closure in a predetermined operative opened position, and bracket means interconnecting said closure and said support means for retaining said escape means in a predetermined operative position with respect to said closure.

5. In aircraft, a fuselage having an opening, a closure movably supported at an edge of said opening, escape means pivotally suspended from said closure, swingable support means for supporting said escape means from said closure, manually operated hoisting and lowering means for retracting and extending said escape means for egress from said fuselage opening, means interconnecting said closure with said fuselage for retaining said closure in a predetermined operative opened position, further means interconnecting said closure and said support means for retaining said escape means in a predetermined operative position with respect to said closure, and frictional pivot means associated with said hoisting and lowering means for retarding the gravitational lowering of said emergency exit means from said support means.

6. An exit arrangement comprising a compartment having an opening in a wall thereof, a closure pivotally mounted upon said wall adjacent said opening, supporting bracket means pivotally mounted upon said closure, strut means connecting said closure with said wall for maintaining said closure in a predetermined position, further strut means connecting said supporting bracket means with said closure for maintaining said supporting bracket means in a predetermined position, and longitudinally extensible exit means supported from said supporting bracket means for facilitating the exit of an occupant from the compartment through said opening.

7. An emergency exit arrangement for a compartment having an opening in a wall thereof, a closure pivotally mounted adjacent the edges of said wall opening, supporting means pivotally mounted upon said closure, strut means connecting said closure with said wall for maintaining said closure in an operative position, further strut means connecting said supporting means with said closure for maintaining said supporting means in a predetermined operative position with respect to said closure in said operative position, and longitudinally extensible exit means including a plurality of telescopic tubular elements supported from said supporting means for facilitating the exit of an occupant through said opening.

8. An exit arrangement for a compartment having an opening in a wall thereof, a closure pivotally mounted adjacent an edge of said wall opening for movement between open and closed positions, supporting bracket means pivotally mounted upon said closure for movement between operative and retracted positions, strut means connecting said closure with said wall for maintaining said closure in an open operative position, rotatable lowering means operatively associated with said closure and said supporting bracket means, further strut means connecting said supporting bracket means with said closure for maintaining said supporting bracket means in a predetermined operative position and extensible tubular exit means suspended from said lowering means and said supporting bracket means for facilitating the lowering of said exit means for the egress of an occupant from said compartment through said opening.

9. An emergency exit arrangement for a compartment having an opening in a wall thereof, a closure pivotally mounted adjacent an edge of said wall opening for movement between open and closed positions, supporting bracket means pivotally mounted upon said closure for movement between operative and retracted positions, strut means connecting said closure with said wall for maintaining said closure in an open operative position, rotatable lowering means operatively associated with said closure and said supporting bracket means, manually adjustable friction means associated with said rotatable lowering means for controlling said lowering means, further strut means connecting said supporting bracket means with said closure for maintaining said supporting bracket means in a predetermined operative position and extensible tubular exit means pivotally suspended from said lowering means and said supporting bracket means for facilitating the lowering of said exit means for the egress of an occupant from said compartment through said opening.

10. The combination with an aircraft fuselage having an opening in a substantially vertical said wall thereof, a door movably mounted upon said fuselage upon a substantially vertically disposed hinge axis arranged to serve as a closure for said opening, and bracket means swingably mounted on said door for movement between operative and inoperative positions with respect to said door, of emergency exit means including a plurality of telescoping tubular elements suspended from said bracket means, said telescoping tubular elements extensible by gravity from their support upon said bracket means and said door in the operative and opened position.

WILBUR W. OSBORNE.

References Cited in the file of this patent
UNITED STATES PATENTS

| Number | Name | Date |
|---|---|---|
| 2,037,805 | Lindstedt | Apr. 21, 1936 |
| 2,050,593 | Traut | Aug. 11, 1936 |
| 2,052,439 | Bailey | Aug. 25, 1936 |
| 2,075,042 | Knerr | Mar. 30, 1937 |
| 2,196,546 | Bowers | Apr. 9, 1940 |
| 2,213,310 | Gimenez et al. | Sept. 3, 1940 |
| 2,383,930 | Reynolds | Aug. 28, 1945 |
| 2,405,878 | Elwert | Aug. 13, 1946 |
| 2,529,908 | Bortner et al. | Nov. 14, 1950 |